US009137155B2

(12) United States Patent
Ramesh et al.

(10) Patent No.: US 9,137,155 B2
(45) Date of Patent: Sep. 15, 2015

(54) NETWORK VIRTUALIZATION IN ACCESS NETWORKS

(71) Applicant: Avaya Inc., Santa Clara, CA (US)

(72) Inventors: Deepak Ramesh, Bangalore (IN); Vinuta K. S, Bangalore (IN); Shyamsunder Natarajan, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 191 days.

(21) Appl. No.: 13/631,975

(22) Filed: Sep. 29, 2012

(65) Prior Publication Data

US 2014/0092913 A1    Apr. 3, 2014

(51) Int. Cl.
*H04L 1/00* (2006.01)
*H04L 12/721* (2013.01)
*H04L 12/46* (2006.01)

(52) U.S. Cl.
CPC ............ *H04L 45/66* (2013.01); *H04L 12/4641* (2013.01)

(58) Field of Classification Search
CPC ...... H04L 12/56; H04L 45/66; H04L 12/4641
See application file for complete search history.

(56) References Cited

U.S. PATENT DOCUMENTS

| 2004/0184408 | A1* | 9/2004 | Liu et al. ..................... 370/236 |
| 2006/0262735 | A1 | 11/2006 | Guichard et al. |
| 2008/0031261 | A1* | 2/2008 | Addeo et al. ............ 370/395.53 |
| 2008/0127338 | A1* | 5/2008 | Cho et al. ..................... 726/22 |
| 2009/0168666 | A1* | 7/2009 | Unbehagen et al. .......... 370/254 |
| 2011/0069711 | A1* | 3/2011 | Jha et al. ................. 370/395.53 |

OTHER PUBLICATIONS

Combined Search and Examiner Report Issued in Corresponding Application No. GB1311102.6 dated Dec. 18, 2013.

* cited by examiner

*Primary Examiner* — Anez Ebrahim
(74) *Attorney, Agent, or Firm* — IP Spring

(57) ABSTRACT

A method, system and computer readable medium for advertising and interoperating Layer 2 VPN services from an access node to a core network. The method can include executing, using one or more processors, a routing protocol on an access node to establish adjacency with a core network node in an access mode. The method can also include mapping, using the one or more processors, an access network Layer 2 service identifier to a core network service identifier. The method can further include advertising, using the one or more processors, a mapping for the L2VPN service to the core network node. The method can also include sending, using the one or more processors, network traffic from the access node to the core network node without core network encapsulation.

6 Claims, 4 Drawing Sheets

NETWORK VIRTUALIZATION IN ACCESS NETWORKS

TECHNICAL FIELD

Embodiments relate generally to computer networks, and more particularly, to methods, systems and computer readable media for advertising and interoperating Layer 2 VPN services from access nodes to a core network.

BACKGROUND

Typically, virtual service fabric originates at the aggregation switches, which are typically the core and distribution nodes in a network. Some customers may demand that these services originate at access network elements to which the servers are attached. In order to make the services originate at an access network element or access node, such as an access switch, the access switch may need to execute a core network protocol (e.g., SPBm).

Executing a full core network suite on an access node may present several problems or limitations. For example, control plane scalability may become an issue. Also, access nodes typically have limited CPU and memory resources compared to servers and the limited resources may make it difficult to execute a full core network protocol suite on an access node.

Further, there is typically a large number of access nodes compared to servers. If each of the access nodes operates as a core network element (e.g., as a Backbone Edge Bridge or BEB), there may need to be a large number of unicast and multicast trees. Also, older access node hardware may not be able to support newer core network protocols such as Mac-in-Mac encapsulation/de-encapsulation, which may lead to new hardware requirements.

Embodiments were conceived in light of the above-mentioned problems and limitations, among other things.

SUMMARY

Embodiments can include a method for advertising and interoperating an L2VPN service from an access node to a core network node. The method can include executing, using one or more processors, a routing protocol on an access node to establish adjacency with a core network node in an access mode. The method can also include mapping, using the one or more processors, an access network Layer 2 service identifier to a core network service identifier. The method can further include advertising, using the one or more processors, a mapping for the L2VPN service to the core network node. The method can also include sending, using the one or more processors, network traffic from the access node to the core network node without core network encapsulation.

The routing protocol can be ISIS. Also, the advertising can include sending an ISIS-SPB TLV message from the access node to the core network node. The access node may not advertise itself as a core network node to the core network. The core network node can be an immediate upstream core network node of the access node and wherein the access node is configured to not perform topology computations to reach other network nodes different from the immediate upstream network node. The core network encapsulation can include Mac-in-Mac encapsulation.

Embodiments can include a method for advertising and interoperating an L2VPN service from a core network node to an access network node. The method can include executing, using one or more processors, a routing protocol from a core network node towards an access node in an access mode. The method can also include extracting, using the one or more processors, an access network Layer 2 service identifier to a core network service identifier mapping from a routing protocol message received from the access node. The method can further include creating, using the one or more processors, a VLAN on the core network node and adding to the VLAN a port corresponding to a port on which the service mapping was received. The method can also include preventing, using the one or more processors, routing messages received from other core network nodes from reaching the access node.

The method can also include advertising the L2VPN service to other core network nodes using the routing protocol, wherein the other core network nodes do not advertise the L2VPN service to access nodes connected the other core network nodes. The routing protocol can be ISIS. The L2VPN service mapping can include an ISIS TLV.

Embodiments can include a system having an access node and a core network node. The access node can include an access node processor coupled to an access node data storage device having stored therein software instructions that, when executed by the access node processor, cause the access node processor to perform operations.

The access node operations can include executing a routing protocol on an access node to establish adjacency with a core network node in an access mode. The access node operations can also include mapping an access network Layer 2 service identifier to a core network service identifier. The access node operations can further include advertising a mapping for an L2VPN service to the core network node. The access node operations can also include sending network traffic from the access node to the core network node without core network encapsulation.

The core network node can include a core network node processor coupled to a core network node data storage device having stored therein software instructions that, when executed by the core network node processor, cause the core network node processor to perform operations. The core network node operations can include executing, using one or more processors, a routing protocol from the core network node towards the access node in an access mode. The core network node operations can also include extracting, using the one or more processors, an access network Layer 2 service identifier to a core network service identifier mapping from a routing protocol message received from the access node. The core network node operations can further include creating, using the one or more processors, a VLAN on the core network node and adding to the VLAN a port corresponding to a port on which the service mapping was received. The core network node operations can also include preventing, using the one or more processors, routing messages received from other core network nodes from reaching the access node.

The access network Layer 2 service identifier can be a VLAN tag and the core network service identifier can be an ISID. The routing protocol can be ISIS. The advertising can include sending an ISIS-SPB TLV message from the access node to the core network node. The access node may not advertise itself as a core network node to the core network.

The core network node can be an immediate upstream core network node of the access node and wherein the access node is configured to not perform topology computations to reach other network nodes different from the immediate upstream network node. The core network encapsulation can include Mac-in-Mac encapsulation.

DETAILED DESCRIPTION

Figure 1:
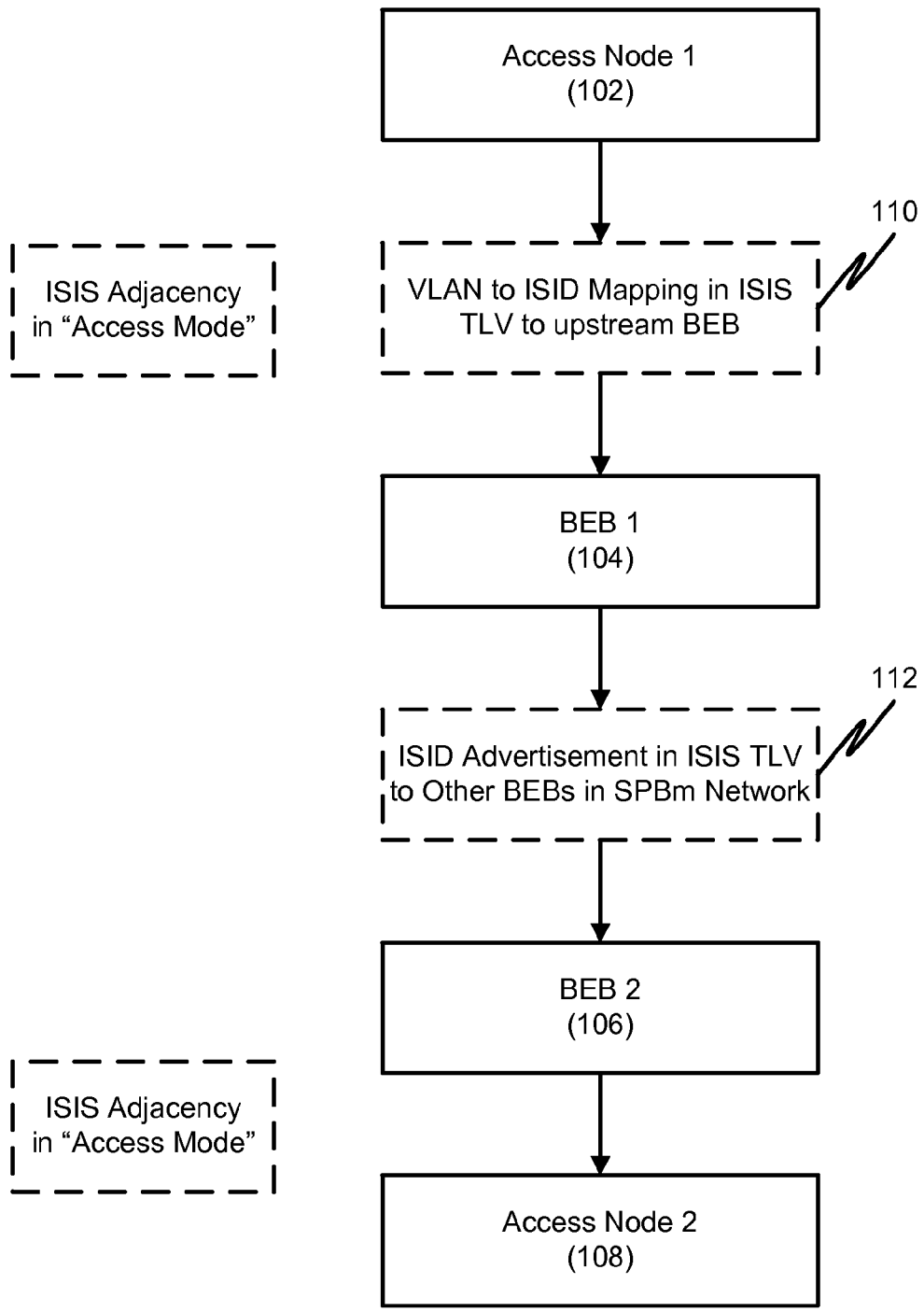
FIG. 1 is a diagram of an example network showing example control plane functions in accordance with at least one embodiment.

As shown in FIG. 1, control plane functions are illustrated in a network 100, which includes a first access node 102, a first core network element (e.g., BEB 1) 104, a second core network element (e.g., BEB 2) 106 and a second access node 108.

In operation, the first access node 102 can send a VLAN to ISID mapping in an ISIS TLV message (110) to an upstream core network server, e.g., BEB 1 104. In turn, BEB 1 104 can send an ISID advertisement in ISIS TLV (112) to other core network nodes (e.g., BEB 2 106) in the core network (e.g., an SPBm network). ISIS adjacency between the access nodes (102 and 108) and the core network nodes (104 and 106) can be handled in Access Mode.

Figure 2:
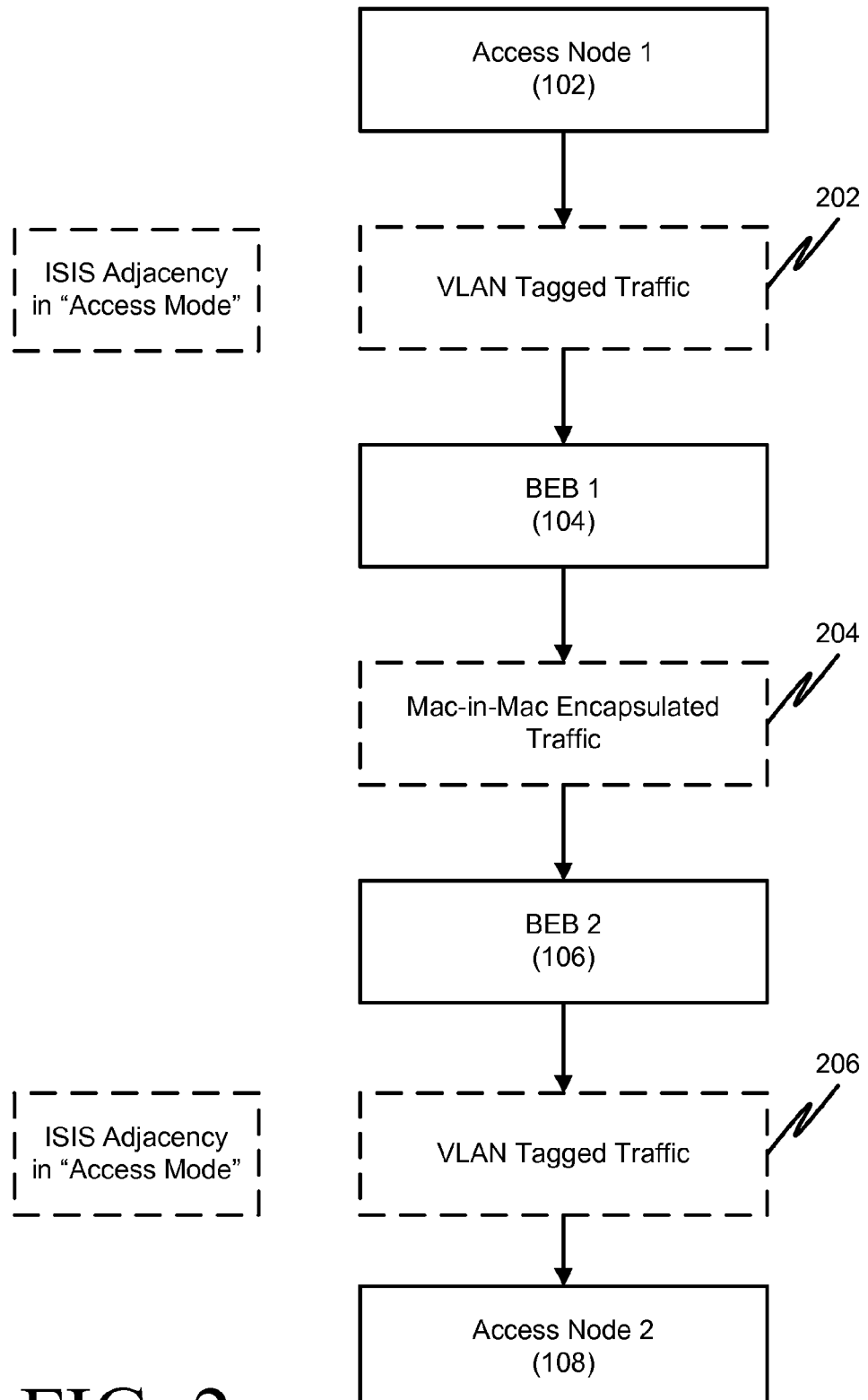
FIG. 2 is a diagram of an example network showing example data plane functions in accordance with at least one embodiment.

As shown in FIG. 2, data plane functions are illustrated in a network 100, which includes a first access node 102, a first core network element (e.g., BEB 1) 104, a second core network element (e.g., BEB 2) 106 and a second access node 108, as discussed above.

In operation, the first access node 102 can send VLAN tagged traffic (202) to an upstream core network server, e.g., BEB 1 104. In turn, BEB 1 104 can encapsulate the VLAN tagged traffic, for example using Mac-in-Mac encapsulation, and the encapsulated traffic (204) to other core network nodes (e.g., BEB 2 106) in the core network.

A receiving core network node, e.g., BEB 2 106, can de-encapsulate the traffic and forward the traffic as VLAN tagged traffic (206) to an access node such as Access Node 2 108.

Figure 3:
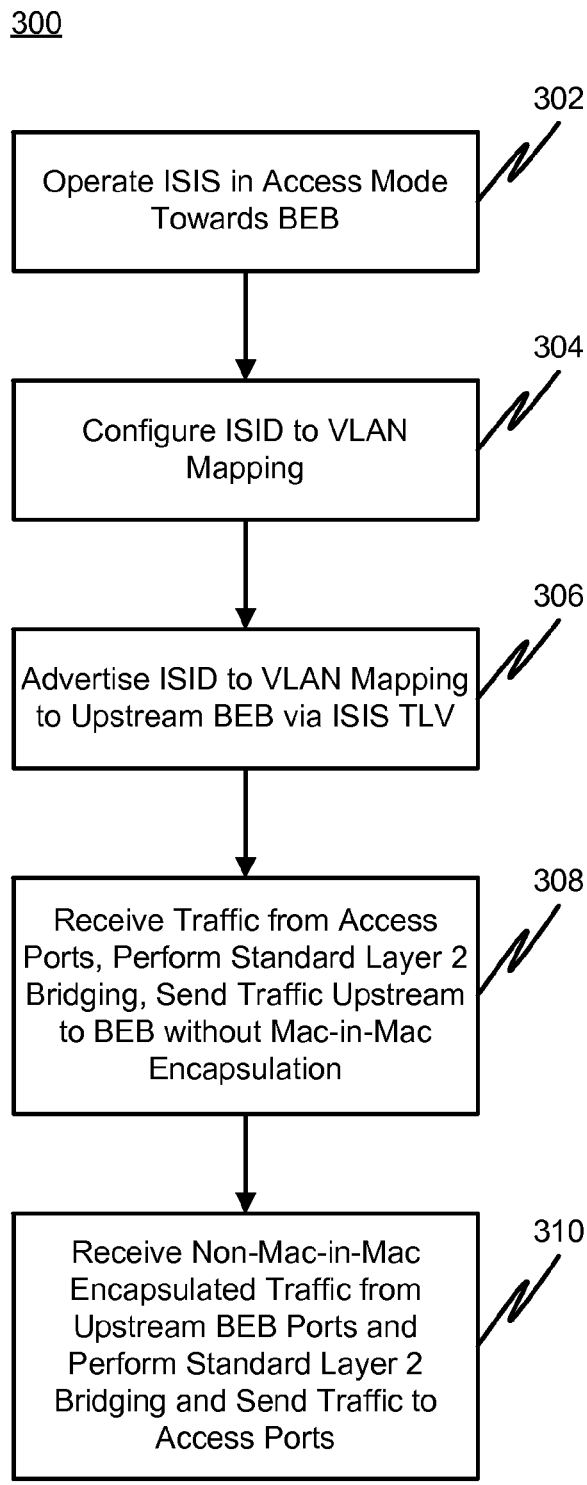
FIG. 3 is a flow chart showing an example method for access node processing in accordance with at least one embodiment.

FIG. 3 is a flow chart showing an example method 300 for access node processing. Processing begins at 302 where the access node executes a routing protocol (e.g., ISIS) in an access mode toward a core network node (e.g., an immediate upstream BEB). Processing continues to 304.

At 304, a core network service identifier, such as an ISID (e.g., as defined in the 802.1ah standard), to an access network Layer 2 service identifier VLAN mapping is configured. The configuration can be performed manually by a user and/or automatically by the access node or another system. Processing continues to 306.

At 306, the access node advertises the ISID to VLAN mapping to the upstream BEB via an ISIS TLV message. Processing continues to 308.

At 308, the access node receives traffic from one or more access ports and performs standard Layer 2 bridging. Then, the access node send the traffic to the upstream BEB without core network encapsulation (e.g., without Mac-in-Mac encapsulation). Processing continues to 310.

At 310, the access node receives non-encapsulated traffic from the upstream BEB and performs standard Layer 2 bridging. Then, the access node sends the traffic to the appropriate access port(s). It will be appreciated that 302-310 can be repeated in whole or in part.

Figure 4:
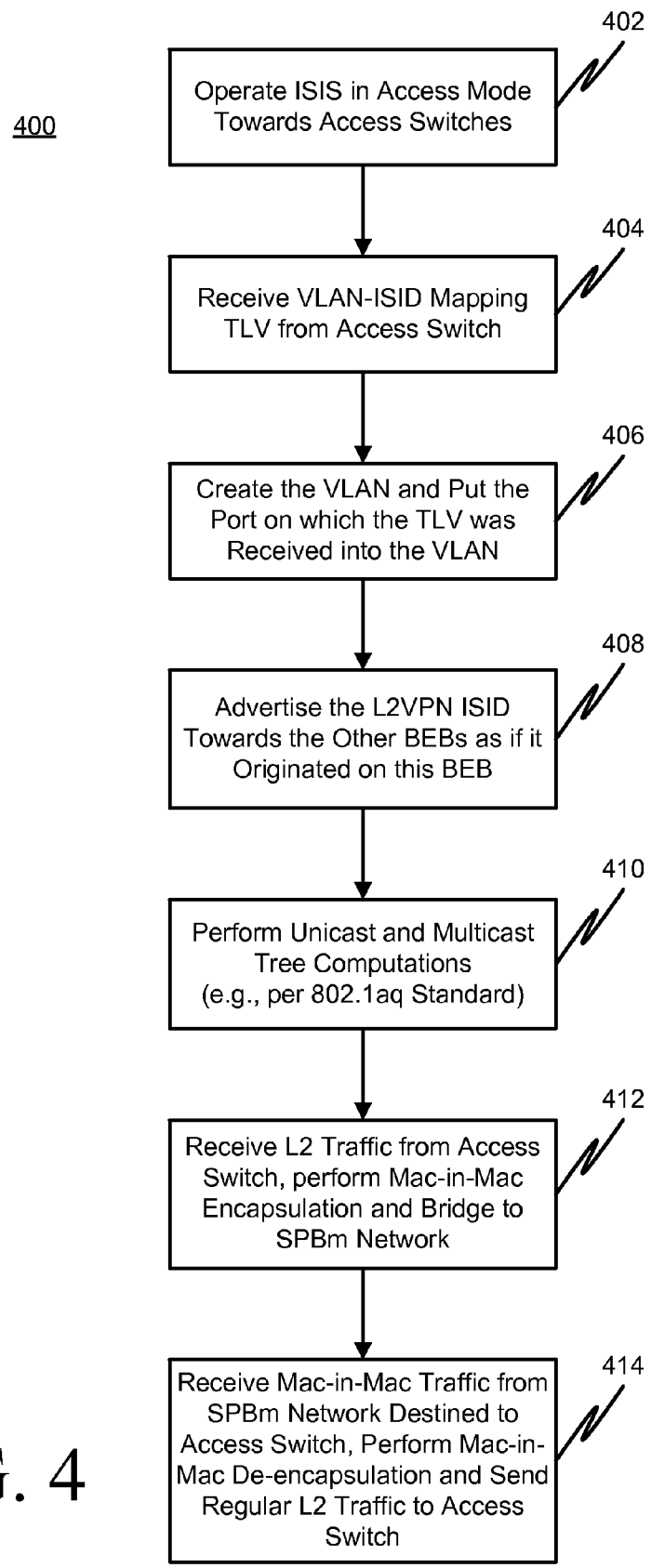
FIG. 4 is a flow chart showing an example method for core network node processing in accordance with at least one embodiment.

FIG. 4 is a flow chart showing an example method 400 for core network node processing in accordance with at least one embodiment. Processing begins at 402, where the core network node (e.g., BEB 1 104) operates a routing protocol (e.g., ISIS) in an access mode toward one or more access nodes. Processing continues to 404.

At 404, the core network node receives a VLAN to ISID mapping for an L2VPN from an access node in a routing protocol message (e.g., an ISIS TLV message). Processing continues to 406.

At 406, the core network node creates a VLAN corresponding to the VLAN to ISID mapping from the access node. The core network node puts the port from which the VLAN-ISID mapping was received into the VLAN. Processing continues to 408.

At 408, the core network node advertises the L2VPN ISID towards other core network nodes as if it originated from the core network node and not from the access node. Processing continues to 410.

At 410, the core network node performs unicast and multicast tree computations, e.g., in accordance with the 802.1aq standard. Processing continues to 412.

At 412, the core network node receives L2 traffic from the access node, performs encapsulation (e.g., Mac-in-Mac encapsulation) and bridges the encapsulated traffic to the core network. Processing continues to 414.

At 414, the core network node receives encapsulated traffic from the core network destined for the access node. The core network node performs de-encapsulation and sends the traffic as regular Layer 2 traffic to the port corresponding to the destination access node. It will be appreciated that 402-414 can be repeated in whole or in part.

It will be appreciated that the modules, processes, systems, and sections described above can be implemented in hardware, hardware programmed by software, software instructions stored on a nontransitory computer readable medium or a combination of the above. A system for advertising and interoperating Layer 2 VPN services from access nodes to a core network, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for advertising and interoperating Layer 2 VPN services from access nodes to a core network.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system comprising:
an access node, having an access node processor coupled to an access node data storage device having stored therein software instructions that, when executed by the access node processor, cause the access node processor to perform operations including:
executing a routing protocol on the access node to establish adjacency with a core network node in an access mode;
mapping an access network Layer 2 service identifier to a core network service identifier, wherein the mapping includes mapping of a VLAN to an ISID;
advertising the mapping for an L2VPN service to the core network node; and sending network traffic from the access node to the core network node without encapsulation; and
wherein the core network node includes a core network node processor coupled to a core network node data storage device having stored therein software instructions that, when executed by the core network node processor, cause the core network node processor to perform operations including:
executing, using one or more processors, a routing protocol from the core network node towards the access node in an access mode;
extracting, using the one or more processors, an access network Layer 2 service identifier to a core network service identifier mapping from a routing protocol message received from the access node, wherein the access network Layer 2 service identifier to a core network service identifier mapping includes mapping of a VLAN to an ISID;
creating, using the one or more processors, a VLAN on the core network node and adding to the VLAN a port corresponding to a port on which the service mapping was received; and
preventing, using the one or more processors, routing messages received from other core network nodes from reaching the access node.

2. The system of claim 1, wherein the routing protocol is ISIS.

3. The system of claim 1, wherein the routing protocol is ISIS and the advertising includes sending an ISIS-SPB TLV message from the access node to the core network node.

4. The system of claim 1, wherein the access node does not advertise itself as a core network node to the core network.

5. The system of claim 1, wherein the core network node is an immediate upstream core network node of the access node and wherein the access node is configured to not perform topology computations to reach other network nodes different from the immediate upstream network node.

6. The system of claim 1, wherein the core network encapsulation includes Mac-in-Mac encapsulation.

* * * * *